United States Patent [19]

Avar et al.

[11] 3,910,993
[45] Oct. 7, 1975

[54] ARYL PHOSPHONOUS ACIDS USEFUL AS U.V. STABILIZERS

[75] Inventors: Lajos Avar, Binningen; Kurt Hofer, Munchenstein, both of Switzerland

[73] Assignee: Sandoz Ltd., Basel, Switzerland

[22] Filed: June 21, 1973

[21] Appl. No.: 371,992

[30] Foreign Application Priority Data
June 23, 1972  Switzerland................ 9511/72
July 7, 1972  Switzerland................ 10194/72

[52] U.S. Cl. ............. 260/502.5; 106/3; 106/177; 162/158; 252/8.6; 252/300; 260/45.75; 260/45.9; 260/107; 260/212; 260/220; 260/230; 260/429 R; 260/429.9; 260/438.1; 260/439 R
[51] Int. Cl.² ........................... C07F 9/48
[58] Field of Search ..................... 260/502.5

[56] References Cited
UNITED STATES PATENTS
2,230,371  2/1941  Bolton ................. 260/502.5
3,270,091  8/1966  Spivack ................ 260/502.4 R FOREIGN PATENTS OR APPLICATIONS
557,556  6/1957  Belgium ............. 260/502.5
961,832  11/1947  France ............. 260/502.5

OTHER PUBLICATIONS
Frank, "Chemical Review," Vol. 61, No. 4, (Aug. 1961), pp. 389, 392, 393, 394, 423.
Gevaert "Chem. Abstracts," Vol. 51, (1957), Col. 17545.

*Primary Examiner*—Joseph E. Evans
*Attorney, Agent, or Firm*—Gerald D. Sharkin; Richard E. Vila; Melvyn M. Kassenoff

[57] ABSTRACT

Compounds of formula I,

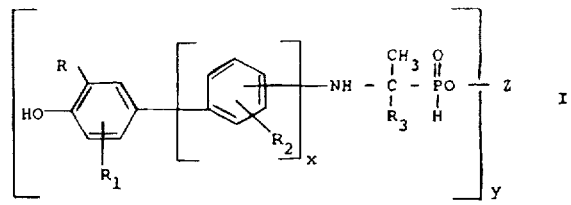

in which
R signifies alkyl, cycloalkyl, alkylcycloalkyl, cycloalkylalkyl, alkylcycloalkylalkyl or aralkyl, all unsubstituted or substituted by halogen, any phenyl moiety in the aralkyl radical optionally being substituted by 1 or 2 alkyl radicals
$R_1$ signifies hydrogen or one of R significances
$R_2$ signifies hydrogen, halogen or alkyl unsubstituted or substituted by halogen,
$R_3$ signifies alkyl, aralkyl, unsubstituted phenyl or phenyl substituted by alkyl, alkoxy or halogen
X signifies 0 or 1,
y signifies 1 or 2,
z signifies hydrogen or y-valent metal, their production and use as u.v. stabilizers for organic materials.

9 Claims, No Drawings

ARYL PHOSPHONOUS ACIDS USEFUL AS U.V. STABILIZERS

The invention relates to u.v. absorbing compounds.

The invention provides compounds of formula I,

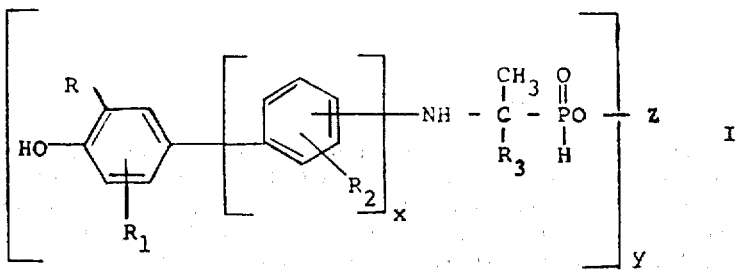

in which R signifies an alkyl radical of up to 18 carbon atoms; a cycloalkyl radical of 5 to 8 ring carbon atoms; an alkylcycloalkyl radical of up to 18 carbon atoms, the cycloalkyl moiety containing 5 to 8 carbon atoms; a cycloalkylalkyl radical of up to 18 carbon atoms, the cycloalkyl moiety containing 5 to 8 carbon atoms; an alkylcycloalkylalkyl radical of up to 18 carbon atoms, the cycloalkyl moiety containing 5 to 8 carbon atoms; or an aralkyl radical of up to 18 carbon atoms, such radicals being unsubstituted or substituted by 1 or 2 substituents selected from fluorine, chlorine or bromine, any phenyl moiety in said aralkyl radical optionally being substituted or further substituted by 1 or 2 alkyl radicals of 1 to 4 carbon atoms, $R_1$ signifies a hydrogen atom or one of the significances of R, $R_2$ signifies a hydrogen atom, a fluorine, chlorine or bromine atom or an alkyl radical of 1 to 6 carbon atoms, unsubstituted or substituted by 1 or 2 substituents from fluorine, chlorine or bromine, $R_3$ signifies an alkyl radical of 1 to 10 carbon atoms, an aralkyl radical of 7 to 10 carbon atoms, an unsubstituted phenyl radical or a phenyl radical substituted by 1 or 2 substituents selected from alkyl radicals of 1 to 4 carbon atoms, alkoxy radicals of 1 to 4 carbon atoms, fluorine, chlorine or bromine, $x$ signifies 0 or 1

$y$ signifies 1 or 2, and

Z signifies a hydrogen atom or a y-valent metal ion.

The compounds of formula I, stated above, may be obtained by reacting a compound of formula II,

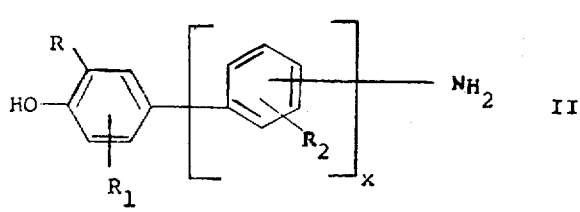

in which R, $R_1$, $R_2$, and $x$ are as defined above, with a compound of formula III,

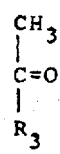

in which $R_3$ is as defined above, and hypophosphorous acid, to obtain a compound of formula I in which Z signifies a hydrogen atom and, where required, converting such compound into metal salt form.

The reaction is conveniently carried out in an inert organic solvent or, where the compound of formula III is a liquid, using such compound as solvent. The reaction conditions, e.g., reaction temperature and times are not critical. Where the compound of formula III is acetone, the reaction commences at room temperature. It is preferred, however, to heat the reaction mixture, preferably to the boiling point of the compound of formula III, or of the organic solvent, thus obviating the need for stirring. Conversion of compounds of formula I, in which Z signifies hydrogen, to the metal salt forms may be carried out in conventional manner by treatment with a salt of the desired metal.

The compounds of formula I may be isolated in conventional manner.

The compounds of formulae II and III are either known or obtainable in conventional manner from available starting materials.

Any alkyl radicals in the compounds of formula I may be primary, secondary or tertiary, linear or branched. As examples of primary linear alkyl radicals may be given methyl, ethyl, propyl, butyl, pentyl, hexyl and the unbranched alkyl radicals of 7 to 18 carbon atoms. As examples of branched primary alkyls may be given 2-methyl-1-propyl, 2,2-dimethyl-1-propyl, 2-methyl-1-butyl, 2-ethyl-1-butyl, 2,2-dimethyl-1-butyl, 2-methyl-1-pentyl and 3-methyl-1-pentyl. As examples of secondary alkyl radicals may be given isopropyl, 2-butyl, 3-methyl-2-butyl, 2-pentyl, 3-hexyl and 2-methyl-3-pentyl. As examples of tertiary alkyl radicals may be given tert-butyl 2-methyl-2-butyl and 2-methyl-2-pentyl. As examples of cycloalkyl radicals may be given cyclopentyl, cyclohexyl, cycloheptyl and cyclooctyl, of alkylcycloalkyl may be given 2-, 3-, or 4-methylcyclohexyl, 2,5-, 2,6-, 3,4- or 3,5-dimethylcyclohexyl, 2-propylcyclohexyl and 3,3,5-trimethylcyclohexyl, and of cycloalkylalkyl radicals may be given cyclohexylmethyl, 2-cyclohexylethyl, cycloheptylmethyl and 3-cyclohexylpropyl.

In the compounds of formula I, any halogen atom is preferably a chlorine atom. As examples of haloalkyl radicals may be given chloromethyl and chloroethyl. Of the aralkyl radicals in the compounds of formula I, the preferred such radicals are benzyl and 2-phenylethyl radicals. Where, in the compounds of formula I, $x$ signifies 1, the diphenyl linkage is preferably in the ortho position to the —NH linkage.

Preferred compounds of formula I are the compounds of formula Ia,

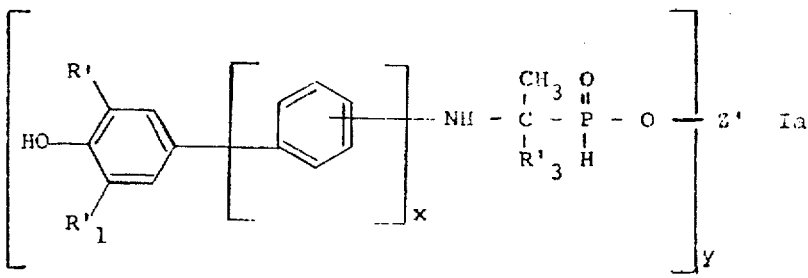

in which R' signifies an alkyl radical of 1 to 9 carbon atoms; a cycloalkyl radical of 5 to 7 carbon atoms; an alkylcycloalkyl or a cycloalkylalkyl radical of up to 9 carbon atoms, the cycloalkyl moiety containing 5 to 7 carbon atoms, or a phenylalkyl radical in which the phenyl radical is unsubstituted or substituted by 1 or 2 alkyl radicals of 1 to 4 carbon atoms, R'$_1$ signifies a hydrogen atom or has one of the significances of R', above, R'$_3$ signifies an alkyl radical of 1 to 5 carbon atoms or a phenyl radical, Z' signifies hydrogen, nickel, zinc, manganese, copper or calcium, and $x$ and $y$ are as defined above.

Further preferred compounds of formula I are the compounds of formula Ib,

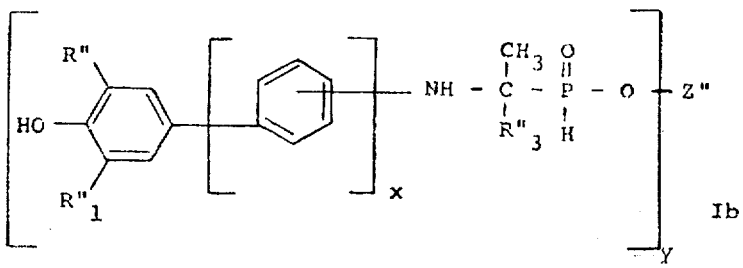

in which R'' signifies an alkyl radical of 3 to 8 carbon atoms,

R''$_1$ signifies a hydrogen atom or has one of the significances of R'', above, R$_3$'' signifies an alkyl radical of 1 to 4 carbon atoms, Z'' signifies hydrogen, nickel, zinc or manganese, and $x$ and $y$ are as defined above.

Still further preferred compounds of formula I are the compounds of formula Ic,

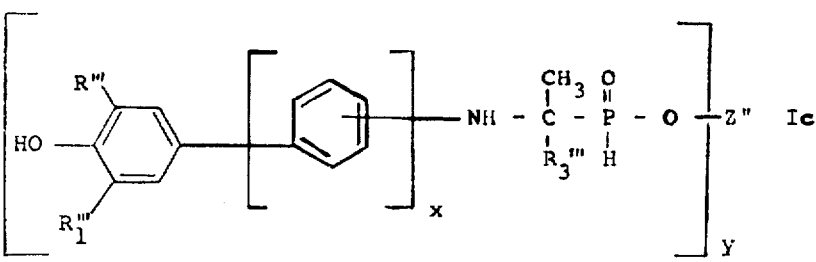

in which R''' signifies a tertiary alkyl radical of 4 to 6 carbon atoms,

R$_1$''' signifies hydrogen or has one of the significances of R''', above,

R$_3$''' is an alkyl radical of up to 2 carbon atoms, and $x$, $y$ and $z''$ are as defined above.

In the compounds of formula Ic, R''' and R'''$_1$ may, for example, signify tert-butyl, 2-methyl-2-butyl or 2-methyl-2-pentyl. However, the most preferred compounds are those in which R''' and R'''$_1$ both signify tert-butyl radicals. Also, in the compounds of formula Ic, R'''$_3$ preferably signifies a methyl radical. Z'' preferably signifies hydrogen, nickel or manganese.

The compounds provided by the present invention possess u.v. absorbing properties and are useful as u.v. stabilizers. For the use as stabilizers, the compounds may be incorporated into materials which are sensitive to light or applied to these materials in a coating operation to form a protective surface film thereon. By their stabilizing action the compounds applied in this way preserve the sensitive substances from degradation. The compounds have a particularly wide area of application in plastics technology, being suitable, for example, as stabilizers for the following synthetic materials: cellulose acetate, cellulose acetobutyrate, polyethylene, polypropylene, polyvinyl chloride, polyvinyl chloride acetate, polyamides, polystyrene, ethyl cellulose, cellulose nitrate, polyvinyl alcohol, silicone rubber, cellulose propionate, melamineformaldehyde resins, urea-formaldehyde resins, allyl casting resins, polymethyl methacrylate, polyesters, polyacrylnitrile, and the corresponding copolymers, for example ABS polymers. The disclosed compounds are also suitable for the stabilization of natural products such as rubber, cellulose, wool and silk. The materials for stabilization may be in the form of sheets, rods, coatings, foils, films, tapes, fibres, granules, powders or other forms of elaboration, or in the form of solutions, emulsions or dispersions. The compounds are incorporated into or coated upon the materials using standard methods. A particularly important mode of application consists in mixing intimately a plastic material, for example polypropylene granules, with the compound, for example in a kneading machine, followed by extrusion. Employing this method, homogeneous distribution is obtained, which is important for good protection.

The material may be extruded, for example, in the form of foils, tubings or filaments. The latter may be converted into textiles. By this mode of application, the stabilizer is incorporated into the polypropylene prior to its elaboration into a textile material. Textile yarns and fabrics may also be treated with the new stabilizers, for example in an aqueous liquor containing the finely dispersed compound of formula I. Textiles of polyethylene terephtalate and cellulose acetate fibres are suitable for this mode of application. Synthetic materials need not necessarily be in the final stage of polymerization or condensation before the compounds of formula I are incorporated. It is possible to mix monomers or prepolymers or precondensates with the new stabilizers and to convert only then the synthetic material into its definitive form by means of condensation or polymerization. Besides being suitable for the stabilization of clear films, plastics and the like, the new compounds of formula I are applicable in opaque, semi-opaque and translucent materials with a surface susceptible to degradation by ultra-violet radiation. Examples of such materials are foam plastics, opaque films and coatings, opaque papers, transparent and opaque pigmented plastics, fluorescent pigments, automobile and furniture polishes, creams, lotions and related products, whether opaque, clear or translucent.

The present invention relates further to the materials which contain compounds of formula I for the purpose of stabilization. As shown by the few examples outlined above, these compounds can be incorporated into the materials to be protected at any stage of processing, using normal methods. The amount used varies in dependence on the compound used and the substrate being protected. However, the compounds are generally incorporated in an amount between 0.01 and 5%, or preferably 0.05 and 1%, in relation to the weight of the organic material to be protected. The stabilized organic materials may contain compounds of formula I alone, or these compounds together with other additives to improve the properties, for example other ultra-violet absorbers and stabilizers against degradation by heat and oxygen. Among the latter, those belonging to other chemical classes than the compounds of formula I are of major interest, for example 2-hydroxy-benzo-phenones, 1,2,3-triazoles, organic sulphur, tin and trivalent phosphorus compounds, and nickel salts of organic carboxylic acids. Such stabilizer mixtures often provide extremely good stabilization owing to their synergistic action.

The following Examples, in which the parts and percentages are by weight and the temperatures in degrees centigrade, illustrate the invention.

EXAMPLE 1

29.8 parts of 3,5-di-tertiary butyl-4-hydroxy-4'-aminodiphenyl are dissolved in 160 parts of acetone. While stirring at room temperature, 6.6 parts of 100% hypophosphorous acid are added and the solution is boiled at reflux for 3 hours, on which a precipitate forms which is filtered off by suction while warm, washed with acetone and dried. The compound of formula

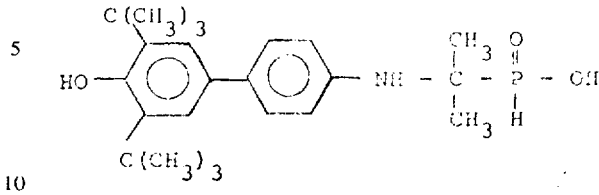

is obtained.

| Elementary Analysis: | C% | H% | N% | P% |
|---|---|---|---|---|
| calculated | 68.4 | 8.5 | 3.5 | 7.6 |
| found | 67.9 | 8.6 | 3.5 | 7.3 |

EXAMPLE 2

59.4 parts of 3,5-di-tertiary butyl-4-hydroxy-2'-aminodiphenyl are dissolved in 200 parts of acetone. While stirring at room temperature, 13.2 parts of 100% hypophosphorous acid are added, and the solution is maintained at reflux for 5 hours, on which a precipitate forms which is filtered off by suction at room temperature, washed with acetone and dried. The compound of formula

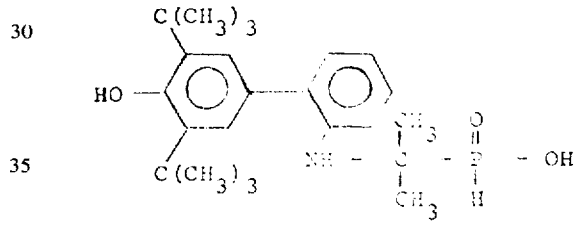

is obtained.

| Analysis: | C% | H% | N% | P% |
|---|---|---|---|---|
| calculated | 68.4 | 8.5 | 3.47 | 7.67 |
| found | 68.2 | 8.5 | 3.7 | 7.5 |

EXAMPLE 3

80.6 parts of the compound produced in Example 2 are dissolved warm in 1,000 parts of ethanol and cooled to 40°C. At this temperature within 10 minutes 11.22 parts of KOH dissolved in 100 parts of water or ethanol are added to the solution, and then a solution of 23.7 parts of $NiCl_2$—$6H_2O$ in ethanol is added dropwise, on which the solution colours green and a precipitate forms. The solvent is largely eliminated by distillation, and the remaining green paste is triturated with 500 parts of water. The resulting light green precipitate is filtered off by suction, washed with water and dried at 120°C. The compound of formula

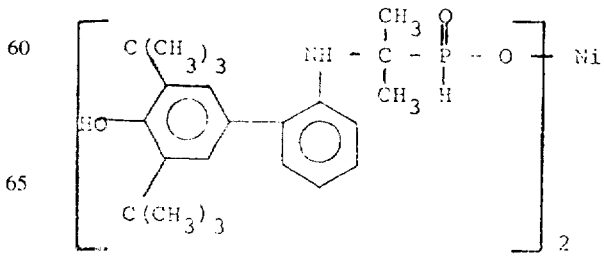

is obtained.

| Analysis: | Ni: | calculated | 6.8% |
|---|---|---|---|
| | | found | 6.4% |

EXAMPLE 4

4.0 parts of the compound produced in Example 1 are mixed with 100 parts of methanol and the mixture heated to 55°C. At this temperature 5cc of 2 normal KOH solution are added to the mixture. After about 5 minutes 1 gr. of $MnCl_2$—$4H_2O$ dissolved in 15 parts of water is added to the solution and reaction is allowed to continue for 1 hour. The solvent is now eliminated by distillation and the residue is triturated with 100 parts of water. The precipitate thus formed is filtered off by suction, washed with water and dried. The compound of formula

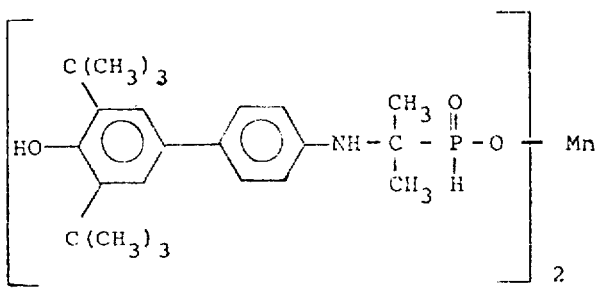

is obtained.

| Elementary Analysis: | Calculated | 6.4% | Mn |
|---|---|---|---|
| | found | 6.1% | Mn |

In manner analogous the nickel salts and the salts of zinc, copper and calcium are produced.

EXAMPLE 5

35 parts of 2,6-di-tertiary butyl-4-aminophenol are dissolved in 200 parts of acetone. While stirring 15.3 parts of 50% hypophosphorous acid are added to the solution and it is boiled for 3 hours at reflux, on which a precipitate forms which is filtered off by suction while warm, washed with acetone and dried. Then 6.54 parts of the product cited above are dissolved in 200 parts of ethanol and a solution of 1.12 parts of KOH in 10 parts of water are added at 50°C. To the resulting weakly yellow solution a solution of 2.37 parts of $NiCl_2$—$6H_2O$ dissolved in 20 parts of ethanol is added. After 30 minutes the solvent is eliminated by distillation and the residue is triturated with 100 cc of water. The precipitate formed is filtered off by suction, washed with water and dried.

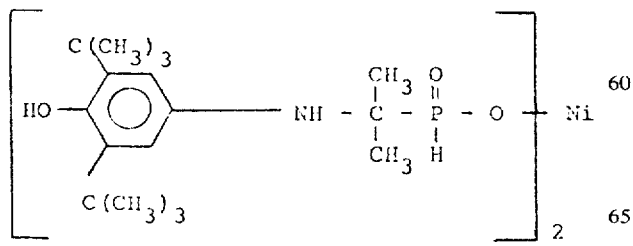

is obtained.

| Analysis: | Calculated | Ni | 8.3% |
|---|---|---|---|
| | found | Ni | 9.0% |

APPLICATION EXAMPLE

Non-stabilized polypropylene is mixed homogeneously with 0.5% of the compound of Example 3 on a roll-train at 180°C and elaborated into foils of 0.3 mm of thickness. Results of texts for stability in a "Klinatest" apparatus, following the De La Rue method at a temperature of 40°C and a relative humidity of 75% with strong ventilation and irradiation by 16 Philips sunlamps and 16 Philips Blacklamps showed that the polypropylene containing the compound had improved stability over a control sample without the compound incorporated.

What is claimed is:

1. A compound of the formula

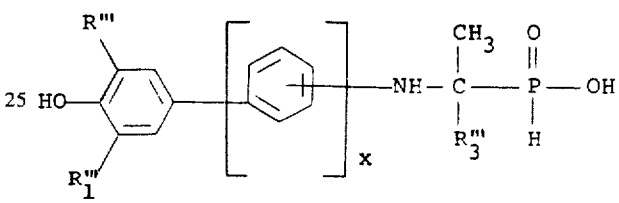

wherein $R'''$ is tertiary alkyl of 4 to 6 carbon atoms,
$R_1'''$ is hydrogen or tertiary alkyl of 4 to 6 carbon atoms,
$R_3'''$ is alkyl of up to 2 carbon atoms, and
$x$ is 0 or 1.

2. A compound according to claim 1, wherein $R_1'''$ signifies a tertiary alkyl radical of 4 to 6 carbon atoms.

3. A compound according to claim 1, wherein $R_3'''$ signifies a methyl radical.

4. A compound according to claim 1, wherein $R_1'''$ signifies a tertiary alkyl radical of 4 to 6 carbon atoms and $R_3'''$ signifies a methyl radical.

5. A compound according to claim 4, wherein $R'''$ and $R_1'''$ both signify tertiary butyl radicals.

6. The compound according to claim 4, of formula,

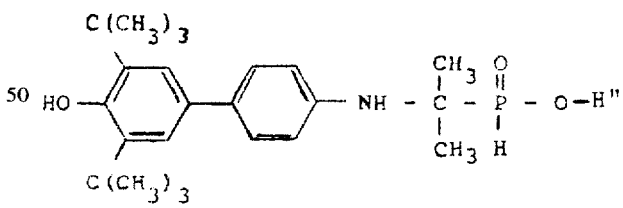

7. The compound according to claim 5, of formula,

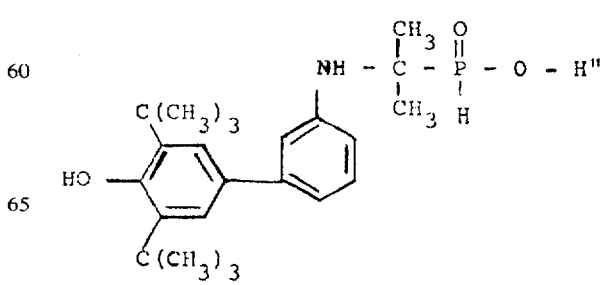

8. The compound according to claim 5, of formula,
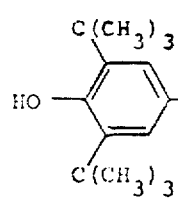 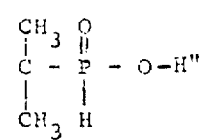
9. The compound according to claim 1 of the formula
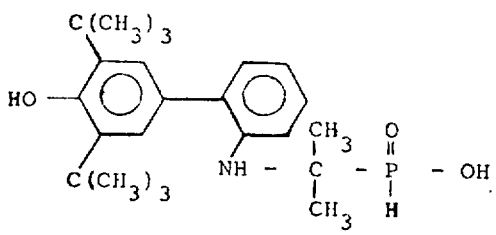
* * * * *